(12) United States Patent
Hazan et al.

(10) Patent No.: US 11,135,720 B2
(45) Date of Patent: Oct. 5, 2021

(54) METHOD AND SYSTEM FOR PROGRAMMING A COBOT FOR A PLURALITY OF INDUSTRIAL CELLS

(71) Applicant: SIEMENS INDUSTRY SOFTWARE LTD., Tel Aviv (IL)

(72) Inventors: Moshe Hazan, Elad (IL); Shaul Badusa, Tel-Aviv (IL)

(73) Assignee: Siemens Industry Software Ltd., Tel Aviv (IL)

(*) Notice: Subject to any disclaimer, the term of this patent is extended or adjusted under 35 U.S.C. 154(b) by 403 days.

(21) Appl. No.: 16/168,180

(22) Filed: Oct. 23, 2018

(65) Prior Publication Data
US 2020/0122327 A1    Apr. 23, 2020

(51) Int. Cl.
*B25J 9/16* (2006.01)
*B25J 13/06* (2006.01)
*G05B 19/4155* (2006.01)

(52) U.S. Cl.
CPC .......... *B25J 9/1666* (2013.01); *B25J 9/1671* (2013.01); *B25J 13/06* (2013.01); *G05B 19/4155* (2013.01); *G05B 2219/40476* (2013.01)

(58) Field of Classification Search
CPC ........ B25J 9/1666; B25J 9/1671; B25J 13/06; B25J 9/1605; G05B 19/4155; G05B 2219/40476; G05B 2219/39136; G05B 2219/40382; G05B 2219/40515; G05B 2219/40091; G05B 2219/40168; G05B 2219/40311; G05B 2219/39014; G05B 2219/40121; G05B 2219/40126; G05B 2219/40415; G05B 2219/31371; G05B 2219/31373; Y02P 90/80
See application file for complete search history.

(56) References Cited

U.S. PATENT DOCUMENTS

| | | | |
|---|---|---|---|
| 6,445,964 B1 | 9/2002 | White et al. | |
| 10,475,240 B2 * | 11/2019 | Evans | B25J 9/1671 |
| 2012/0150352 A1 * | 6/2012 | Park | B25J 13/006 |
| | | | 700/264 |

(Continued)

FOREIGN PATENT DOCUMENTS

EP    2783812 A2    10/2014

*Primary Examiner* — Khoi H Tran
*Assistant Examiner* — Tanner L Cullen
(74) *Attorney, Agent, or Firm* — Laurence A. Greenberg; Werner H. Stemer; Ralph E. Locher

(57) ABSTRACT

Systems and a method are provided for programming a cobot for a plurality of cells of an industrial environment. A physical cobot is provided within a lab cell comprising physical lab objects. A virtual simulation system receives information inputs on a virtual cobot representing the physical cobot, regarding a virtual lab cell comprising virtual lab objects, and on a plurality of virtual industrial cells comprising virtual industrial objects. Inputs are received from the physical cobot's movement during teaching whereby the physical cobot is moved in the lab cell to the desired position(s) while providing, via a user interface, a visualization of the virtual cobot's movement within a meta cell generated by superimposing the plurality of virtual industrial cells with the virtual lab cell, so that collisions with any object are minimized. A robotic program is generated based on the received inputs of the physical cobot's movement.

12 Claims, 5 Drawing Sheets

(56) References Cited

U.S. PATENT DOCUMENTS

| | | | |
|---|---|---|---|
| 2014/0148949 A1 | 5/2014 | Graca et al. | |
| 2014/0277737 A1 | 9/2014 | Sekiyama et al. | |
| 2015/0331415 A1* | 11/2015 | Feniello | G05B 19/425 |
| | | | 700/257 |
| 2016/0257000 A1* | 9/2016 | Guerin | B25J 9/1605 |
| 2017/0091999 A1 | 3/2017 | Blumenfeld et al. | |
| 2017/0320211 A1* | 11/2017 | Akan | G06F 8/34 |
| 2018/0253516 A1* | 9/2018 | Shimano | G06F 30/20 |
| 2019/0000578 A1* | 1/2019 | Yu | A61B 34/10 |
| 2019/0202055 A1* | 7/2019 | Wang | B25J 9/1671 |
| 2020/0082033 A1* | 3/2020 | Hartsock | G06F 30/20 |
| 2021/0069899 A1* | 3/2021 | Wittmann | B25J 9/16 |
| 2021/0086359 A1* | 3/2021 | Eberst | B25J 9/1666 |

\* cited by examiner

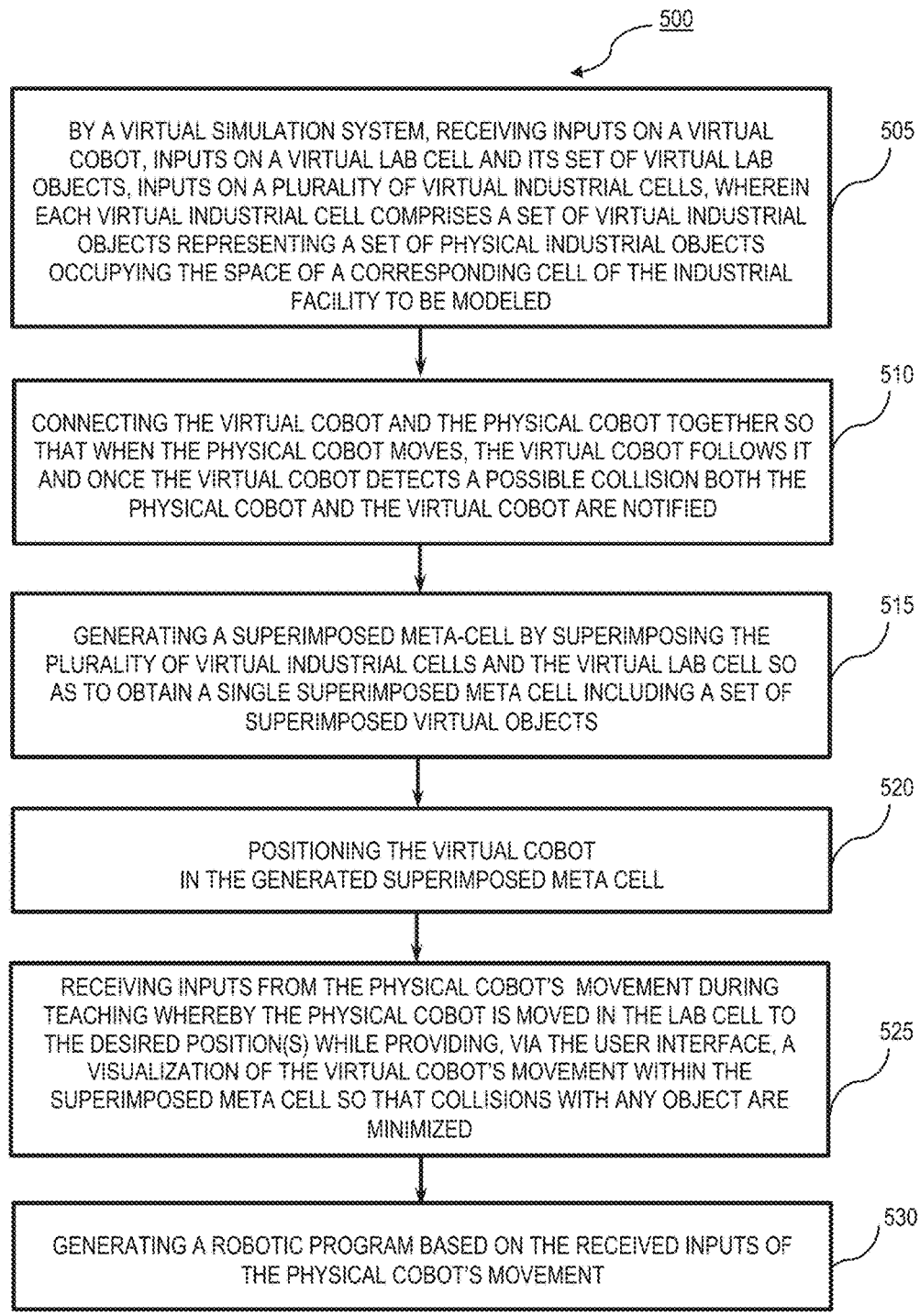

METHOD AND SYSTEM FOR PROGRAMMING A COBOT FOR A PLURALITY OF INDUSTRIAL CELLS

TECHNICAL FIELD

The present disclosure is directed, in general, to computer-aided design, visualization, and manufacturing ("CAD") systems, product lifecycle management ("PLM") systems, product data management ("PDM") systems, and similar systems, that manage data for products and other items (collectively, "Product Data Management" systems or PDM systems). More specifically, the disclosure is directed to production environment simulation.

BACKGROUND OF THE DISCLOSURE

Traditional industrial robots are designed to operate autonomously or with limited human guidance. Cobots are robots intended to physically interact with humans in a shared workspace. The terms "cobots" and "co-robots" indicate "collaborative robots." Cobots are being utilized in greater numbers in several industrial manufacturing fields.

Cobots, being specifically conceived for human interactions, have the advantage of being safer than traditional robots, in that they are able to identify human proximity and reduce speed or stop. Cobots also do not require classic fencing; therefore, they bring about space savings in a facility layout. Cobots are useful for supporting humans addressing smaller tasks that could otherwise be inappropriate for humans, e.g. repetitive tasks, unhealthy/dangerous tasks, e.g. weight lifting and toxic glue applying.

Interaction between a human and a cobot usually take place in a user friendly manner since the human can move the cobot directly with his/her hand in an intuitive way without using a remote controller. Different than traditional robots, cobots are usually programmed manually, whereby a human manually guides the cobot to the desired positions.

FIG. 2 is a drawing schematically illustrating an example of lab cell with a cobot to be programmed manually. In a lab cell 200, a physical cobot 201 is positioned on a table 202 and is surrounded by two additional physical objects 203, 204 representing, for example, a first box 203 and a second box 204. The human hand 205 approaches the cobot 201 to hold it via a grip (not shown) and moves it from the first box 203 to the second box 204. The program corresponding to the manually taught cobot's movement is then downloaded to a physical cobot located in a physical cell of the factory. Therefore, the typical cobot programming scenario consists of a human programmer sitting in a lab cell teaching the physical cobot by moving it at desired position(s). The lab cell may be an ad-hoc conveniently created test lab cell (e.g. at the programmer's office or in the facility), or it may be a selected facility cell.

However, in the lab there might be only a limited portion of all the physical obstacles present in each physical facility cell of the industrial facility, and the programmer needs to take into account all the possible obstacles for programming the cobot to avoid collisions during industrial operations in the industrial cell. In the case of a facility including a plurality of industrial cells, the programmer's task becomes even more complex. Often, in an industrial facility, cobots are employed within several, e.g. dozens or hundreds, of small industrial cells where they perform similar tasks. However, the arrangement of each of the plurality of industrial cells might include different obstacles or same and similar obstacles located in different positions. In such a scenario, the programmer is often independently programming each industrial cell one-by-one; therefore, several cobot programs need to be downloaded and managed.

Current techniques for cobot programming in a multi-cell facility are cumbersome, tedious, error-prone, and otherwise ill-suited for the task. Improved techniques are desirable.

SUMMARY OF THE DISCLOSURE

Various disclosed embodiments include methods, systems, and computer readable mediums for programming a cobot for a plurality of cells of an industrial environment. A method includes providing a physical cobot in a physical lab cell comprising a set of physical lab objects for teaching purposes. The method includes providing a virtual simulation system for simulating, in a virtual environment, a virtual cobot representing the physical cobot. The method further includes providing a user interface for a user to interact with the virtual simulation system. The method further includes receiving inputs on a virtual cobot representing the physical cobot, inputs on a virtual lab cell representing the physical lab cell, inputs on a set of virtual lab objects representing the set of the physical lab objects, inputs on a plurality of virtual industrial cells representing the plurality of cells of the industrial environment to be modeled, wherein each virtual industrial cell comprises a set of virtual industrial objects representing a set of physical industrial objects occupying the space of a corresponding cell of the industrial facility to be modeled. The virtual cobot and the physical cobot are connected together so that when the physical cobot moves, the virtual cobot follows the movement in the virtual environment, and once the virtual cobot detects a possible collision, both the physical cobot and the virtual cobot receive a collision notification. A superimposed meta-cell is generated by superimposing the plurality of virtual industrial cells with the virtual lab cell so as to obtain a single superimposed meta cell comprising a set of superimposed virtual objects. The virtual cobot is positioned in the generated superimposed meta cell. The method further includes receiving inputs from the physical cobot's movement during teaching whereby the physical cobot is moved in the lab cell to the desired position(s) while providing, via the user interface, a visualization of the virtual cobot's movement within the superimposed meta cell so that collisions with any object are minimized. A robotic program is generated based on the received inputs of the physical cobot's movement.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which:

FIG. 5 illustrates a flowchart for programming a physical cobot for a plurality of cells in accordance with disclosed embodiments.

DETAILED DESCRIPTION

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Previous techniques for cobot programming in a multi-cell facility require too much time and effort. The embodiments disclosed herein provide numerous technical benefits, including but not limited to the following examples.

Embodiments may enable programming cobots for industrial usage in tightly coupled physical-digital environments.

Embodiments may also enable cobot programmers to continue teaching the cobot in a manual manner.

Embodiments may also allow obtaining a collision free robotic program.

Embodiments may also permit the obtaining of a single robotic program which is valid for each cobot of each plurality of cells. Advantageously, managing a single robotic program implies maintenance cost savings.

Embodiments may also not require the purchase or installation of new sensors for the physical cobots.

Embodiments may also improve usability for shop-floor applications.

Embodiments may also improve the engineering process.

Embodiments may also provide the programmer with a pseudo "offline-online programming" technique for cobots. The "online-programming" technique is the hand-guided manual programming and the "offline-programming" technique is the virtual validation with virtual objects to obtain a collision-free program. The programmer can generate from his/her lab cell a robotic program which is collision-free with obstacles not present in the lab. Conveniently, the generated program is a global one which is valid for many cobots with different scenarios of obstacle constraints.

Embodiments may also provide the programmers with the advantages of hand-guided cobot programming and virtual reality collision checks.

In embodiments, the physical cobot may advantageously behave with respect to obstacles as if it were in the virtual environment. Any potential collision in the virtual environment may advantageously cause the physical cobot to slow down, stop, steer its motion and/or issue a warning in the physical environment.

In embodiments, performance gains may be achieved by removing all "fully-identical virtual objects" and at the same relative position across the plurality of virtual industrial cells.

Figure 1:
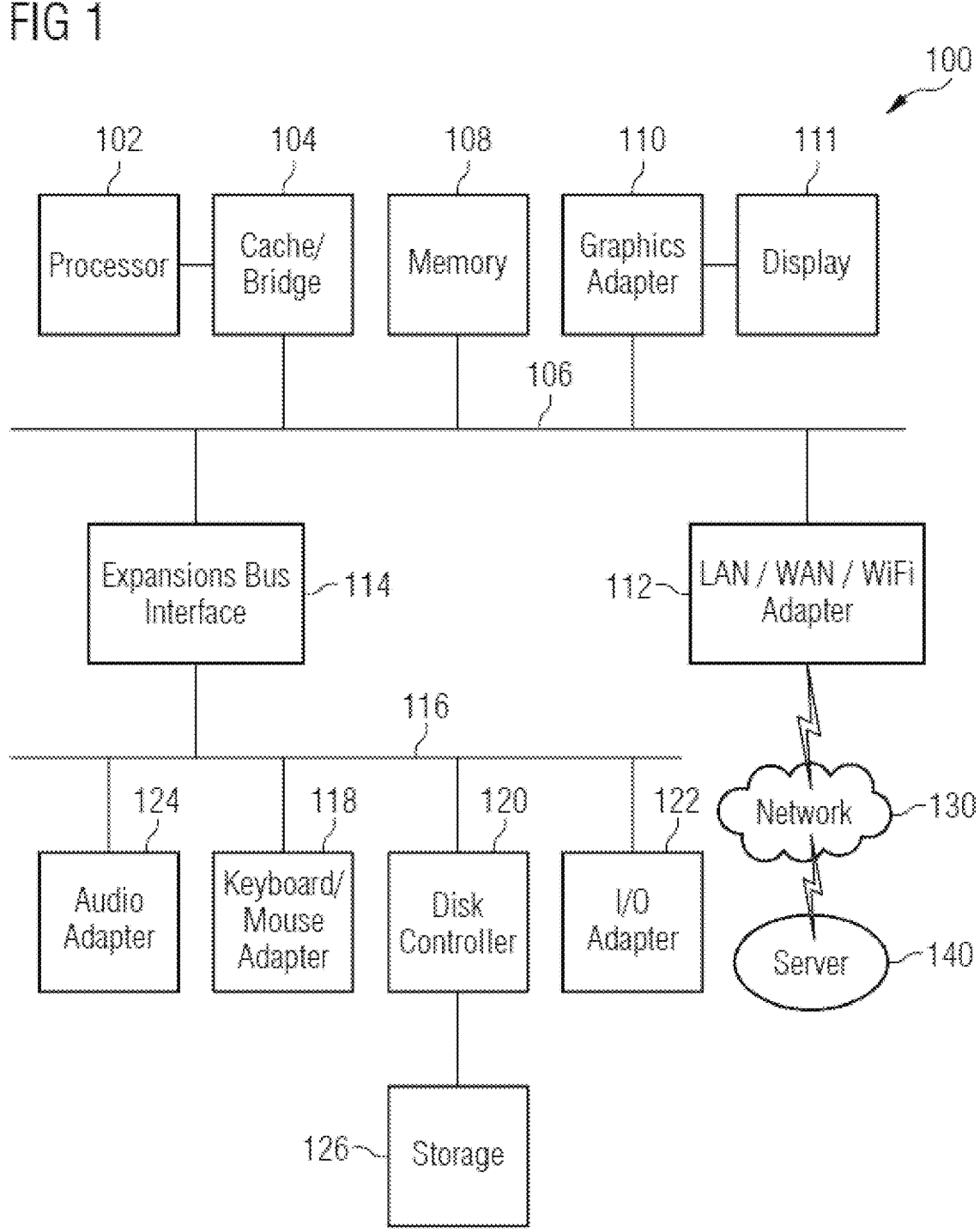
FIG. 1 illustrates a block diagram of a data processing system in which an embodiment can be implemented.
Figure 2:
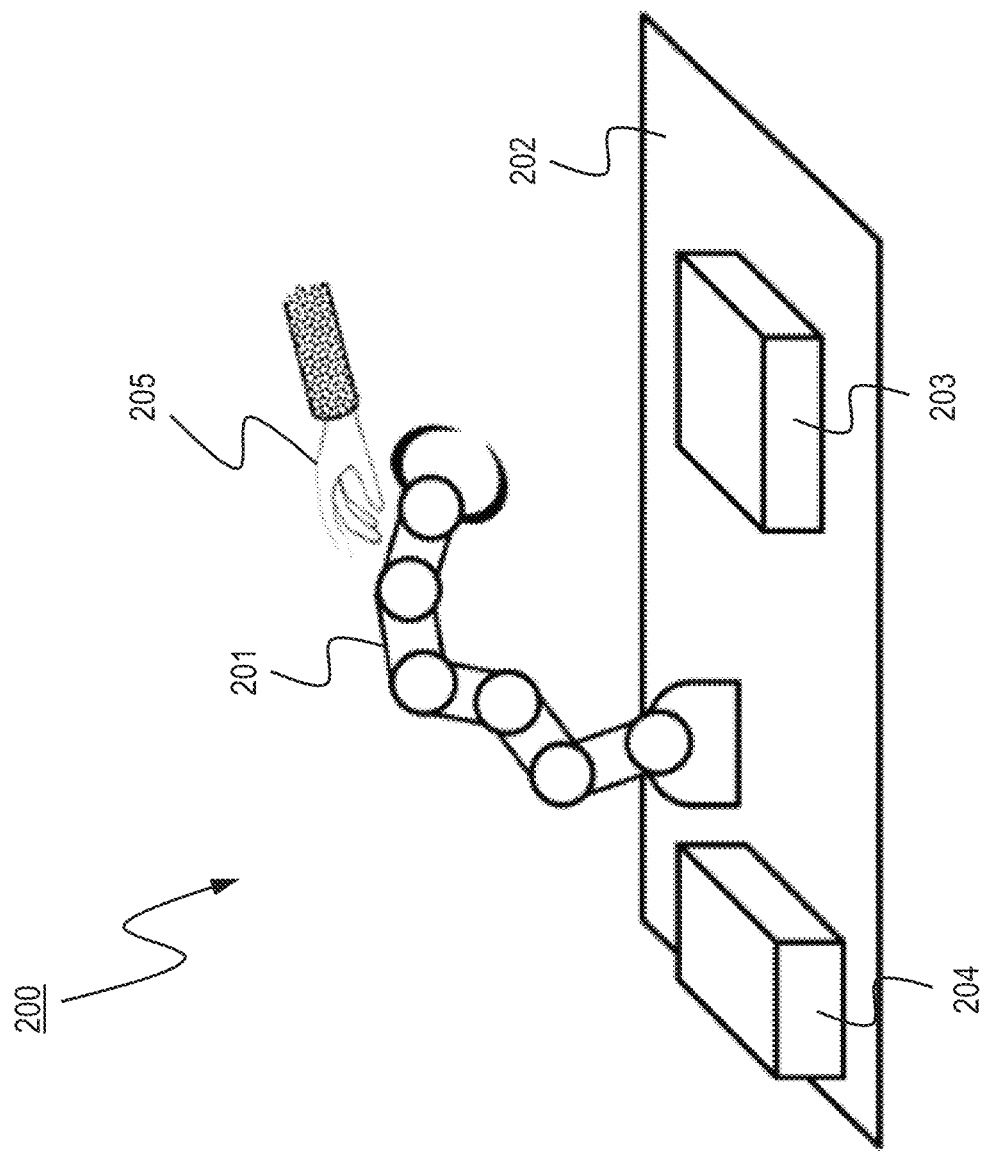
FIG. 2 is a drawing schematically illustrating an example of lab cell with a cobot to be programmed manually.

FIG. 1 illustrates a block diagram of a data processing system 100 in which an embodiment can be implemented, for example as a PDM system particularly configured by software or otherwise to perform the processes as described herein, and in particular as each one of a plurality of interconnected and communicating systems as described herein. The data processing system 100 illustrated can include a processor 102 connected to a level two cache/bridge 104, which is connected in turn to a local system bus 106. Local system bus 106 may be, for example, a peripheral component interconnect (PCI) architecture bus. Also connected to local system bus in the illustrated example are a main memory 108 and a graphics adapter 110. The graphics adapter 110 may be connected to display 111.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to a storage 126, which can be any suitable machine usable or machine readable storage medium, including but are not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, touchscreen, etc.

Those of ordinary skill in the art will appreciate that the hardware illustrated in FIG. 1 may vary for particular implementations. For example, other peripheral devices, such as an optical disk drive and the like, also may be used in addition or in place of the hardware illustrated. The illustrated example is provided for the purpose of explanation only and is not meant to imply architectural limitations with respect to the present disclosure.

A data processing system in accordance with an embodiment of the present disclosure can include an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 112 can be connected to a network 130 (not a part of data processing system 100), which can be any public or private data processing system network or combination of networks, as known to those of skill in the art, including the Internet. Data processing system 100 can communicate over network 130 with server system 140, which is also not part of data processing system 100, but can be implemented, for example, as a separate data processing system 100.

Algorithm of an exemplary embodiment In an exemplary embodiment the main algorithm steps for programming a cobot for an exemplary three industrial cells of an industrial environment are illustrated below; the exemplary embodiments disclosed herein are not limited to three industrial cells—more or less cells industrial are contemplated Assume, for illustration purposes, that this exemplary embodiment refers to the scenario of FIG. 4 where a physical cobot and a virtual cobot are shown.

Figure 4:
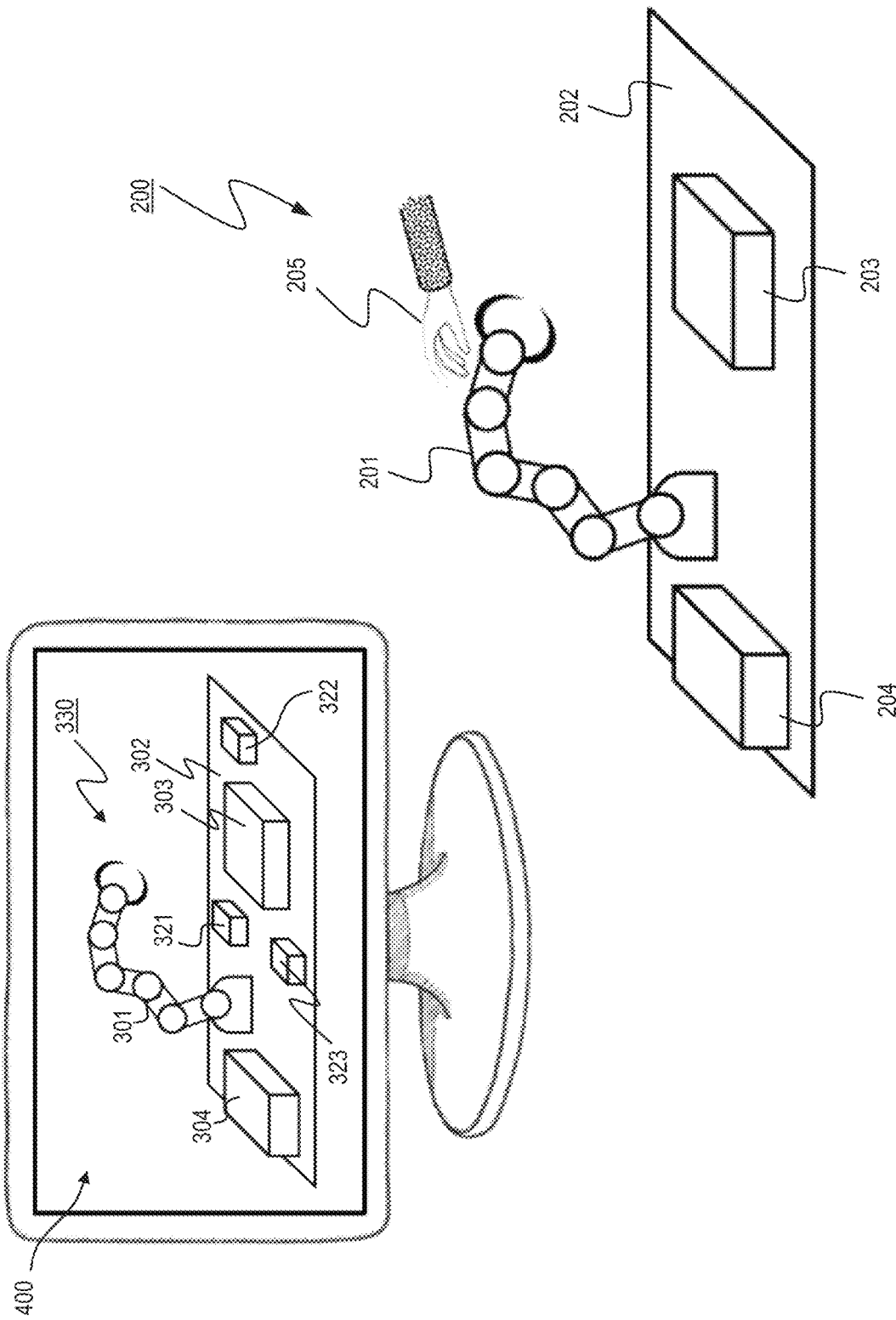
FIG. 4 is a drawing schematically illustrating a physical cobot and a connected virtual cobot in accordance with disclosed embodiments.

FIG. 4 is a drawing schematically illustrating a physical cobot and a connected virtual cobot in accordance with disclosed embodiments.

The physical cobot 201 is provided within a physical lab cell 200 comprising lab physical objects 202, 203, 204. A virtual simulation system not shown is provided for simulating in a virtual environment the virtual cobot 301 representing the physical cobot 201.

Examples of virtual simulation systems include, but are not limited to, Computer Assisted Robotic ("CAR") tools, Process Simulate (a product of Siemens PLM software suite), robotic simulations tools, and other systems for industrial simulation. A user interface 400 is provided for a user to interact with the virtual simulation system. The human user (not shown) is teaching the cobot 201 by hand-guiding it with his/her hand 205.

Step of Factory Modeling

Assume that the industrial environment model is a factory model comprising three virtual industrial cells where a same type of cobot 201 is required to perform some specific operations. Information on the three virtual industrial cells and the virtual lab are received. The modeling of the virtual industrial cells may be performed with CAD, with point cloud formats, or with other types of 3D formats. The factory model supplies the programmer not only with the model of the physical obstacles 202, 203, 204 that are also present in the lab cell 200 but also with the model of the additional obstacles which instead are missing in the lab cell but are present in each virtual industrial cell. All obstacles occupying the space of the virtual industrial cell are herein referred as virtual industrial objects. It is noted that in some embodiments some of such virtual industrial obstacles may already be present in the virtual lab cell at the same relative position (e.g. with respect to the cobot base coordinates), some other might be present but at a different relative position and some other may be additional obstacles not present in the virtual lab cell at all, or any combination thereof.

Figure 3:
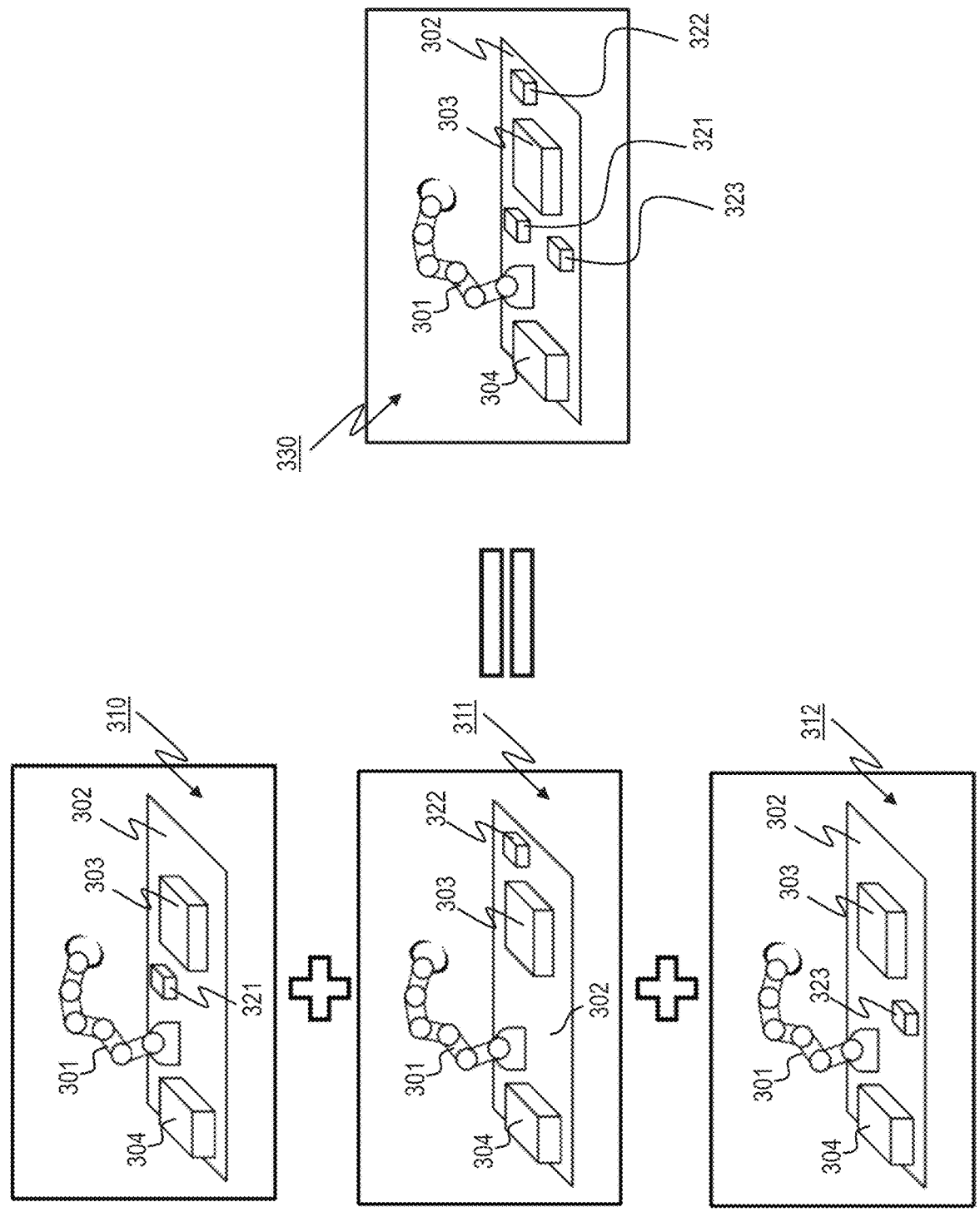
FIG. 3 is a drawing schematically illustrating a superimposed meta-cell in accordance with disclosed embodiments.

In FIG. 3, the three different virtual industrial cells 310, 311, 312 of this exemplary factory model embodiment are shown. Each virtual cell 310, 311, 312 comprises a set of virtual lab objects 302, 303, 304 representing the set of lab physical objects 202, 203, 204 positioned at the same relative position and one additional virtual object 321; 322; 323 not present in the lab cell 200. For example, the first virtual cell 310 comprises an additional third box 321, the second virtual cell 311 comprises an additional forth box 322 and the third virtual cell 312 comprises an additional fifth box 323. A "set" can contain zero or more objects.

Step of Connecting Physical and Virtual Cobot

The virtual cobot 301 is connected with the physical cobot 201 via a connecting software layer as for example a communication protocol like Control Protocol/Internet Protocol ("TCP/IP") protocol. In this mode, the two cobots are connected so that:

when the physical cobot 201 moves, the virtual cobot 301 follows it; and once the virtual cobot detects a collision in the virtual environment, both virtual and physical cobots receive a collision notification. The collision notification may contain instructions causing the cobot to stop, slow down, deviate, and/or to issue a warning.

Step of Generating the Super-Imposed Meta-Cell

For the plurality of industrial cells 310, 311, 312 each one with its cobot 301, a single meta-cell 330 is generated by reallocating all the obstacles 302, 303, 304, 321, 322, 323 from all three different cells into this single meta-cell relative to each cobot base coordinates together with a virtual lab cell (not shown) virtually representing the physical lab cell. This meta-cell 330 comprises a single virtual robot 301 with all obstacles 302, 303, 304, 321, 322, 323 around it in the correct relative position. This meta-cell 330 generated by superimposing the plurality of virtual cells (i.e. all the virtual industrial cells and the not shown virtual lab cell) comprising the virtual objects 302, 303, 304, 321, 322, 323 is herein called "superimposed meta-cell." Advantageously, performance gains are achieved in that it is not necessary anymore to move several identical robots and checking possible collisions with the several identical obstacles that are exactly located in the same relative positions.

Step of Manually Teaching Aided by a User Interface ("UI")

The programmer manually teaches the physical cobot 201 by moving it to the correct positions with his/her hand 205 and the virtual cobot 301 follows the physical cobot 201 by reflecting in the virtual space the physical cobot's movement in the physical space due to the fact that the two cobots 201, 301 are connected with each other, as described above. The programmer looks at the virtual world via the UI interface 400 and holds the physical cobot 201 with his/her hand 205 and moves the physical cobot 201 so that the connected virtual cobot 301 moves around the virtual obstacles 302, 303, 304, 321, 322, 323 towards the desired correct positions (not shown). The user interface 400 may be a screen as shown in FIG. 4. In other embodiments, the user interface may be a three-dimensional ("3D") virtual reality headset, virtual reality glasses, augmented reality devices, or any tool or application presenting in a graphical way the virtual world to the user.

In FIG. 4, within the screen 400, the virtual cobot 301 is positioned in the super-imposed meta cell 330 with virtual obstacles 302, 303, 304, 321, 322, 323. The virtual cobot 301 is connected with the physical cobot 201 of the physical lab cell 200. The user while hand-guiding the physical cobot 201 is able, aided by the monitor 400, to have the connected virtual cobot 301 workaround the virtual obstacles 302, 303, 304, 321, 322, 323.

Step of Getting Notifications Upon Collisions

In case of a collision in the virtual environment of the virtual cobot 301 with any obstacle 302, 303, 304, 321, 322, 323, both the virtual and physical cobots 201, 301 receive a collision notification and they may preferably be blocked and stop.

Step of Generating a Robotic Program

A single robotic program is generated based on the teaching performed by the programmer. In embodiments, the program is exported and then uploaded for the three physical cobots (not shown) of the three physical industrial cells (not shown) whose virtual models correspond to the three virtual industrial cells 310, 311, 312.

FIG. 5 illustrates a flowchart 500 of a method for programming by a data processing system a cobot for a plurality of cells of an industrial environment in accordance with disclosed embodiments. Such method can be performed, for example, by system 100 of FIG. 1 described above, but the "system" in the process below can be any apparatus configured to perform a process as described.

A physical cobot is provided within a lab cell comprising lab physical objects for manual teaching purposes. A virtual simulation system is provided for simulating, in a virtual environment, a virtual cobot representing the physical cobot. A user interface is provided for a user to interact with the virtual simulation system. Examples of user interfaces may include, but are not limited to, screens, virtual reality devices, augmented reality devices, and other tools or application providing a graphical representation of the virtual environment.

At act 505, the virtual simulation system receives information inputs on the virtual cobot virtually representing the physical cobot, information inputs on the virtual lab cell virtually representing the physical lab cell and on its set of virtual lab objects, and information inputs on a plurality of virtual industrial cells representing the plurality of industrial cells of the industrial environment to be modeled. Each virtual industrial cell comprises a set of virtual industrial objects representing a set of physical industrial objects occupying the space of a corresponding cell of the industrial facility to be modeled. The virtual industrial objects may include one or more of the virtual lab objects at the same relative positions and one or more additional virtual objects not present in the virtual lab cell or, if present, positioned at a different relative position, or any combination thereof. The virtual industrial cells may be a virtual representation of a cell of a model of industrial facility or may be a virtual representation of an existing physical industrial cell of an industrial facility.

At act 510, the virtual cobot and the physical cobot are connected together so that when the physical cobot moves, the virtual cobot's movement reflects in the virtual environment the physical cobot's movement in the physical environment. Once the virtual cobot detects a possible collision both the physical cobot and the virtual cobot receive a collision notification. In embodiments, examples of received collisions notifications may include, but are not limited by, instructions to block the cobot, instructions to stop the cobot, instruction to slow the speed of the cobot, motion steering instructions, e.g. to avoid potential collisions, and instructions to issue a warning. In embodiments, the two cobots are connected via a connecting software layer. Examples of connecting software layers may include, but are not limited to, communication protocols such as TCP-IP, Application Program Interfaces ("APIs"), add-ons, plugins, and any other systems for enabling a communication between a physical cobot and a software application.

At act 515, a superimposed meta-cell is generated by superimposing the plurality of industrial virtual cells with the virtual lab cell so as to obtain a single superimposed meta cell including a set of superimposed virtual objects. The set of superimposed virtual objects represents the union of all the virtual objects occupying the space of the virtual industrial cells and of the virtual lab cell, as if they were positioned all in one single cell at the same relative positions. In embodiments, two or more virtual objects which are perfectly matching in size and position may conveniently be considered as one single object for validation purposes.

At act 520, the virtual cobot is positioned in the generated superimposed meta cell.

At act 525, inputs are received from the physical cobot's movement during teaching whereby the physical cobot is moved in the lab cell to the desired position(s) while providing, via the user interface, a visualization of the virtual cobot movement within the superimposed meta cell so that collisions with any object are minimized.

At act 530, a robotic program based on the received inputs of the physical cobot's movement. The generated robotic program is valid for each of the plurality of industrial cells modeled by the plurality of virtual industrial cells. In embodiments, the received inputs from the physical cobot's movement may be relevant data that are deducted from the cobot's movement and preferably be only a subset of the full data movement, or any selectable received information useful for generating a valid cobot's program.

Of course, those of skill in the art will recognize that, unless specifically indicated or required by the sequence of operations, certain steps in the processes described above may be omitted, performed concurrently or sequentially, or performed in a different order.

Those skilled in the art will recognize that, for simplicity and clarity, the full structure and operation of all data processing systems suitable for use with the present disclosure is not being illustrated or described herein. Instead, only so much of a data processing system as is unique to the present disclosure or necessary for an understanding of the present disclosure is illustrated and described. The remainder of the construction and operation of data processing system 100 may conform to any of the various current implementations and practices known in the art.

It is important to note that while the disclosure includes a description in the context of a fully functional system, those skilled in the art will appreciate that at least portions of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims.

What is claimed is:

1. A method for programming by a data processing system a cobot for a plurality of physical industrial cells of an industrial environment, comprising the following steps:
   a) providing a physical cobot in a physical lab cell comprising a set of physical lab objects for teaching purposes;
   b) providing a virtual simulator for simulating, in a virtual environment, a virtual cobot representing the physical cobot;
   c) providing a user interface for a user to interact with the virtual simulator;
   d) receiving inputs on the virtual cobot representing the physical cobot, inputs on a virtual lab cell representing the physical lab cell, inputs on a set of virtual lab objects representing the set of the physical lab objects, inputs on a plurality of virtual industrial cells representing the plurality of physical industrial cells of the industrial environment to be modeled, wherein each virtual industrial cell comprises a set of virtual industrial objects representing a set of physical industrial objects occupying the space of a corresponding physical industrial cell of the industrial facility to be modeled;
   e) connecting the virtual cobot and the physical cobot together so that when the physical cobot moves, the virtual cobot follows the movement in the virtual environment, and once the virtual cobot detects a possible collision, both the physical cobot and the virtual cobot receive a collision notification;
   f) generating a superimposed meta-cell by superimposing the plurality of virtual industrial cells with the virtual lab cell so as to obtain a single superimposed meta cell comprising a set of superimposed virtual objects;
   g) positioning the virtual cobot in the generated superimposed meta cell;
   h) receiving inputs from the physical cobot's movement during teaching whereby the physical cobot is moved in the lab cell to the desired position(s) while providing, via the user interface, a visualization of the virtual cobot's movement within the superimposed meta cell so that collisions with any object are minimized;
   i) generating a robotic program based on the received inputs of the physical cobot's movement.

2. The method of claim 1, wherein the user interface is selected from the group consisting of:
   a screen;
   a virtual reality device;
   an augmented reality device;
   any tool providing a graphical representation of the virtual environment.

3. The method of claim 1, the connecting of step e) is performed by a connecting software layer selected from the group consisting of:
   communication protocols;
   Application Program Interfaces ("APIs");
   add-ons;
   plugins;
   connectors for enabling a communication between a physical robot and a software application.

4. The method of claim 1, the received collision notification comprises instructions selected from the group consisting of:
   blocking instructions;
   stopping instructions;
   speed-slowing instructions;
   motion steering instructions;
   issuing a warning.

5. A data processing system comprising:
   a processor; and
   an accessible memory, the data processing system particularly configured to:
   a) provide a physical cobot in a physical lab cell comprising a set of physical lab objects for teaching purposes;
   b) provide a virtual simulator for simulating, in a virtual environment, a virtual cobot representing the physical cobot;
   c) provide a user interface for a user to interact with the virtual simulator;
   d) receive inputs on the virtual cobot representing the physical cobot, inputs on a virtual lab cell representing the physical lab cell, inputs on a set of virtual lab objects representing the set of the physical lab objects, inputs on a plurality of virtual industrial cells representing a plurality of physical industrial cells of the industrial environment to be modeled, wherein each virtual industrial cell comprises a set of virtual industrial objects representing a set of physical industrial objects occupying the space of a corresponding physical industrial cell of the industrial facility to be modeled;
   e) connect the virtual cobot and the physical cobot together so that when the physical cobot moves, the virtual cobot follows the movement in the virtual environment, and once the virtual cobot detects a possible collision, both the physical cobot and the virtual cobot receive a collision notification;
   f) generate a superimposed meta-cell by superimposing the plurality of virtual industrial cells with the virtual lab cell so as to obtain a single superimposed meta cell comprising a set of superimposed virtual objects;
   g) position the virtual cobot in the generated superimposed meta cell;
   h) receive inputs from the physical cobot's movement during teaching whereby the physical cobot is moved in the lab cell to the desired position(s) while providing, via the user interface, a visualization of the virtual cobot's movement within the superimposed meta cell so that collisions with any object are minimized;
   i) generate a robotic program based on the received inputs of the physical cobot's movement.

6. The data processing system of claim 5, wherein the user interface is selected from the group consisting of:
   a screen;
   a virtual reality device;
   an augmented reality device;

any tool providing a graphical representation of the virtual environment.

7. The data processing system of claim 5, wherein the physical cobot and virtual cobot are connected by a connecting software layer selected from the group consisting of:
communication protocols;
Application Program Interfaces ("APIs");
add-ons;
plugins;
connectors for enabling a communication between a physical robot and a software application.

8. The data processing system of claim 5, the received collision notification comprises instructions selected from the group consisting of:
blocking instructions;
stopping instructions;
speed-slowing instructions;
motion steering instructions;
issuing a warning.

9. A non-transitory computer-readable medium encoded with executable instructions that, when executed, cause one or more data processing systems to:
a) provide a physical cobot in a physical lab cell comprising a set of physical lab objects for teaching purposes;
b) provide a virtual simulator for simulating, in a virtual environment, a virtual cobot representing the physical cobot;
c) provide a user interface for a user to interact with the virtual simulator;
d) receive inputs on the virtual cobot representing the physical cobot, inputs on a virtual lab cell representing the physical lab cell, inputs on a set of virtual lab objects representing the set of the physical lab objects, inputs on a plurality of virtual industrial cells representing a plurality of physical industrial cells of the industrial environment to be modeled, wherein each virtual industrial cell comprises a set of virtual industrial objects representing a set of physical industrial objects occupying the space of a corresponding physical industrial cell of the industrial facility to be modeled;
e) connect the virtual cobot and the physical cobot together so that when the physical cobot moves, the virtual cobot follows the movement in the virtual environment, and once the virtual cobot detects a possible collision, both the physical cobot and the virtual cobot receive a collision notification;
f) generate a superimposed meta-cell by superimposing the plurality of virtual industrial cells with the virtual lab cell so as to obtain a single superimposed meta cell comprising a set of superimposed virtual objects;
g) position the virtual cobot in the generated superimposed meta cell;
h) receive inputs from the physical cobot's movement during teaching whereby the physical cobot is moved in the lab cell to the desired position(s) while providing, via the user interface, a visualization of the virtual cobot's movement within the superimposed meta cell so that collisions with any object are minimized;
i) generate a robotic program based on the received inputs of the physical cobot's movement.

10. The non-transitory computer-readable medium of claim 9, wherein the user interface is selected from the group consisting of:
a screen;
a virtual reality device;
an augmented reality device;
any tool providing a graphical representation of the virtual environment.

11. The non-transitory computer-readable medium of claim 9, wherein the physical cobot and virtual cobot are connected by a connecting software layer selected from the group consisting of:
communication protocols;
Application Program Interfaces ("APIs");
add-ons;
plugins;
connectors for enabling a communication between a physical robot and a software application.

12. The non-transitory computer-readable medium of claim 9, the received collision notification comprises instructions selected from the group consisting of:
blocking instructions;
stopping instructions;
speed-slowing instructions;
motion steering instructions;
issuing a warning.

\* \* \* \* \*